3,015,080
SIGNAL TRANSMISSION LINE
William F. Santelmann, Jr., Lexington, and Allan J. Hingston, Reading, Mass., assignors to Research Corporation, New York, N.Y., a corporation of New York
Filed June 21, 1957, Ser. No. 667,205
5 Claims. (Cl. 333—20)

This invention relates to improvements in systems for the transmission of electrical signals over coaxial cables and more particularly to systems wherein the cable is operating without an impedance matching termination.

The supervision and maintenance of large and complex circuitries such as digital computers frequently involve the transmission and faithful reproduction of wide-band waveforms and signals without impairing the operation of the circuit under test. Conventional equipment for this purpose includes a suitable oscilloscope or a similar type of instrument having a signal input impedance in the order of megohms and a probe line of comparatively short length. In the maintenance of physically large equipment, such as digital computers, it is frequently necessary to compare waveforms or signals at points in the circuitry which are physically remote from one another. In such applications the use of a cathode-ray oscilloscope with a short probe line involves several difficulties. Among these are the delay necessitated by the warm-up interval required for the oscilloscope each time it is moved to a new location, and the inaccuracy and inconvenience of measuring the time relation between waveforms by means of instruments positioned at widely separated points. A further disadvantage commonly encountered is the problem of efficient communication between personnel at the computer control elements and at the circuit elements under test.

These deficiencies can be overcome through the use of a centralized probe system. In such a system a dual gun oscilloscope ideally is placed at the maintenance console and provision is made for connecting its two channels of presentation to any two of the waveforms arriving at the console probe line selection board. The dual gun cathode-ray oscilloscope facility provides simultaneous comparison between two recurrent or non-recurrent waveforms. The probe lines connected to this facility should be equal in length and sufficiently long to provide access to all points of test within the computer circuitry. The probe lines should present similar impedance characteristics to eliminate this as a possible source of discrepancy and/or error and the loading produced by the probe lines on the circuitry under test should be of a magnitude such that there is no degradation of the waveforms due to the presence of the probes. Heretofore, the probe lines have usually been coaxial cables and customarily such cables have been terminated at one or both ends thereof in an impedance equal to the characteristic impedance of the cable such that reflections which might distort the transmitted waveforms or signals are not permitted to occur at the ends of the cable. However, the operating impedance levels of terminated coaxial cables are typically between fifty and a few hundred ohms and it is desirable that the input impedance of the probe system be in the order of megohms. Since no cables are available with characteristic impedances of such magnitude, impedance converting devices, notably cathode followers, have been used as drivers for terminated cables. Such a device produces power gain and must therefore incorporate an active device such as an electron tube or a transistor. This type of circuitry is frequently employed with coaxial probe lines for use with short rise-time (wide band) oscilloscopes, the electron tube being mounted in a suitable housing at the sending end of the cable. Although such systems have been useful, there are a number of inherent disadvantages associated with the use of an active device in the probe line. For instance, there is a definite input voltage limit to a cathode follower which drives a terminated cable; typically it is no more than plus or minus ten volts. There is also a temperature and heat dissipation problem which often results in greatly shortened tube life. A cathode follower has an appreciable warm-up time which becomes critical due to problems of drift if the cathode follower is direct coupled. Finally there are substantial design problems involved in the mounting of a tube in a suitable probe housing and the supplying of power to it.

Because of these serious limitations in the use of such impedance converting devices, entirely passive methods of transmitting waveforms and signals over standard coaxial cables terminated in a resistance of about a megohm are greatly preferred where they have been possible. Such operation will be referred to herein as "unterminated" operation as an impedance of this magnitude is not able to absorb an appreciable amount of energy from waveforms or signals carried by the low impedance coaxial cable. A fundamental characteristic of such an unterminated cable is that signals received at an unterminated end are reflected back along the cable and if both ends of the cable are unterminated the signals will be reflected alternately between the receiving and sending ends until all of the signal energy has been dissipated in cable losses and termination losses. In the prior art, it has usually been the case that probes several feet in length would generate a reflected wave at a frequency greatly in excess of the band width of the oscilloscope so that little, if any, waveform distortion was visible on the oscilloscope. With increases in oscilloscope band width and in probe length, necessary, for example, in the adequate maintenance of large digital computers with a centralized probe system, the signal reflection frequency becomes visible on the oscilloscope. As a practical matter, therefore, use of unterminated long cable transmission for the purpose here involved has not heretofore been feasible.

It is a principal object of the present invention to provide a completely passive, unterminated coaxial cable transmission system for the faithful, direct coupled transmission of high impedance, wide band waveforms and signals.

Another object of the invention is to provide a signal transmission system for use with equipment such as a cathode-ray oscilloscope and including a coaxial cable of a length limited only by the maximum tolerable signal attenuation and signal input capacitance, and which may, therefore, be as long as is necessary for large computer maintenance, even several hundred feet in length.

The novel transmission system of the invention includes an unterminated coaxial cable which may be several hundred feet in length and a complementing network composed entirely of passive elements. This transmission system is suitable for use as a probe line in conjunction with a cathode-ray oscilloscope having a thirty megacycle band width. The coaxial cable preferably utilizes a resistance wire as its central conductor to increase the propagation losses in the cable sufficiently to absorb the energy in a steep wave front so that the amplitude of the reflected wavefront is negligible in comparison with the waveforms of interest which travel the length of the cable only once before being presented on the oscilloscope in contrast with the reflected wave fronts which must traverse the cable length three times, a distance sufficient to adequately attenuate the undesired reflection. The use of such a resistance wire, however, increases the characteristic coaxial cable impairment of output waveforms, particularly when a fast-rise input waveform is applied to the cable. This impaired transient response may be adequately compensated in probes about three feet in length operating with oscilloscopes having a thirty megacycle band width by inserting a small inductance in series with the probe cable at the receiving end. This solution is ineffective with longer probe lines, however, as the duration of the impaired transient response is a direct function of the length of the cable. A passive network, adjusted to be a true transient complement of the coaxial line, provides compensation for the impaired transient output of the resistance damped long coaxial line.

The foregoing and other objects and advantages of the invention will appear more fully from the particular description taken in conjunction with the accompanying drawings, wherein.

The cable employed in the described embodiments is 230 feet long and is operated into a load impedance of one megohm shunted by twenty micromicrofarads. When the step input of FIG. 2a is applied to a cable of this type having no resistance damping, the output waveform of FIG. 2b results. The severe reflections which occur, as shown in FIG. 2b, may be damped out by the use of a resistance wire as the center conductor of the coaxial cable. The step waveform of FIG. 2a, when applied to the subject cable having a center resistance wire of 635 ohms, produces the output waveform as shown in FIG. 2c. As may be seen from that figure the transient response to this input consists of an initial rapid voltage rise to approximately 20% of the final amplitude and a much slower voltage rise subsequently to the final amplitude. This impaired transient response is compensated by the passive complementing network shown in FIG. 1. An output waveform of the passive network alone is shown in FIG. 2d and a compensated output waveform of the combined resistance damped cable and passive network is shown in FIG. 2e.

Figure 1:
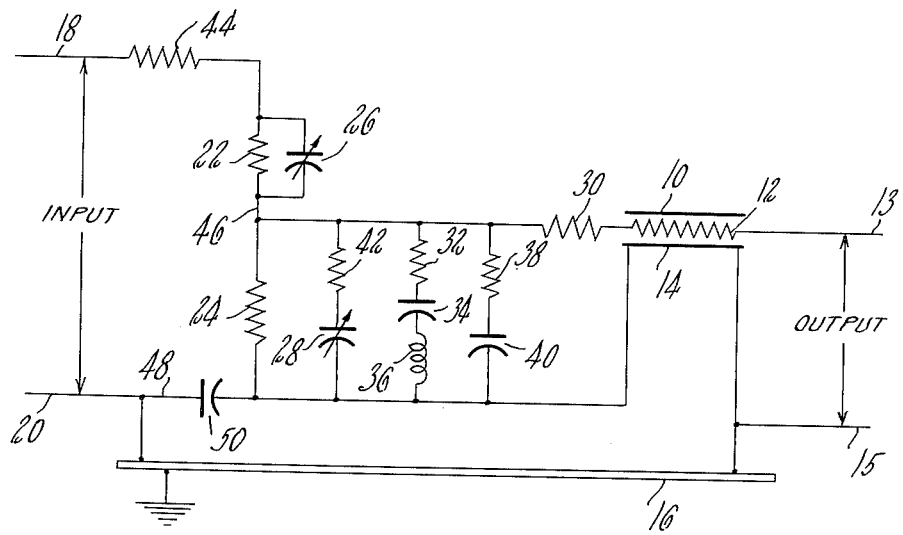
FIG. 1 is a schematic diagram of the preferred embodiment of the invention, a cathode-ray oscilloscope probe line consisting of a passive network and a resistance damped coaxial cable.
Figure 2A:
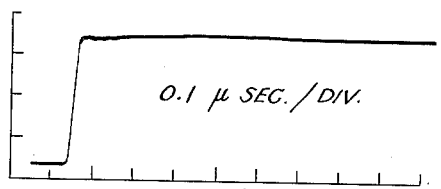
FIG. 2a is a representation of the waveform of the output of a mercury wetted contact relay used to generate a step voltage with a rise time in the order of a few millimicroseconds, as seen on an oscilloscope with a twelve millimicrosecond rise time.
Figure 2B:
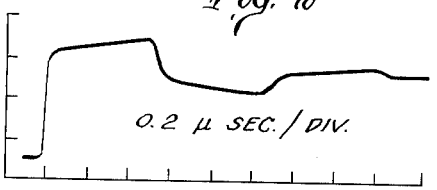
FIG. 2b is a representation of the waveform which results from the transmission of the step waveform of FIG. 2a through a 230 foot undamped, unterminated coaxial cable.
Figure 2C:
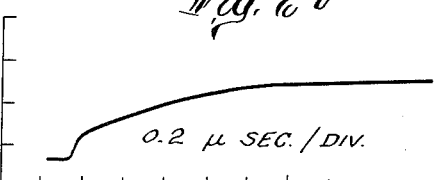
FIG. 2c is a representation of the waveform which results from the transmission of the step wavefrom of FIG. 2a through a 230 foot resistance damped, unterminated coaxial cable.
Figure 2D:
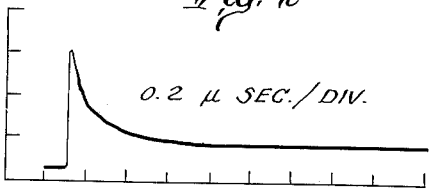
FIG. 2d is a representation of the waveform which results from the transmission of the step waveform of FIG. 2a through a passive network designed according to this invention for use with the cable used in FIG. 2c.
Figure 2E:
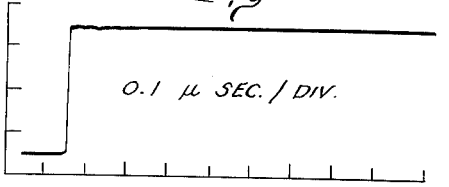
FIG. 2e is a representation of the waveform which results from the transmission of the step waveform of FIG. 2a through the combined passive network and the resistance damped coaxial cable.

With reference to FIG. 1, the coaxial cable is designated by the numeral 10, the resistance wire center conductor by the numeral 12 and the outer conductor by the numeral 14. The output terminals 13, 15 are connected to conductors 12 and 14 respectively, and the latter terminal is also connected to a common ground bus 16. A passive network is connected between the input terminals, 18, 20 of the probe line and the cable 10. This network may be mounted in a compact cylindrical housing (approximately one inch in diameter and five inches in length) with the input terminals connected to conventional probe clips or hooks. Alternately, it may be mounted in a small revolver-shaped probe gun with the input terminals connected to jaws mounted on the housing and actuated by a trigger mechanism associated with the housing.

A resistance capacitance attenuation circuit is utilized in the passive network and comprises two resistances 22, 24 in series, an adjustable trimmer capacitance 26 shunting resistance 22 and the total capacitance of the cable 10 shunting resistance 24. When the time-constant formed by resistance 22 with capacitance 26 and resistance 24 with capacitance 10 are adjusted to equality by means of capacitance 26, the attenuation of this circuit is uniform from direct-current (zero frequency) up to a frequency where the transmission-line characteristics of the coaxial cable become apparent. At this condition of adjustment, waveforms containing frequency components not above this frequency limit (or, stated in the time domain, waveforms with rise times much longer than the signal-transmission time of the coaxial cable) are reproduced faithfully at the output of the coaxial cable. However, input waveforms containing frequency components above this limit, having rise times less than or comparable to the cable transmission time, are distorted by this attenuation circuit, because of the characteristics of the coaxial cable, in such a way as to exaggerate the sudden changes in voltage. A step input waveform is distorted to show a sharp, fast peak whose height varies directly with the attenuation ratio, superimposed on the step waveform. This peak cannot be controlled by capacitance 26 and should be distinguished from the much longer transient effects produced by adjustment of that capacitance. If the attenuation ratio is great enough, the peaking of the waveform is more than enough to compensate for the impaired transient response of the cable. Such overcompensation produces a cable output voltage somewhat greater than desired during the interval of transmission-line behavior of the coaxial cable. Small passive networks may then be tailored to reduce the cable output to the wave-shape characteristics desired in an essentially distortionless transmission system.

Figure 3A:
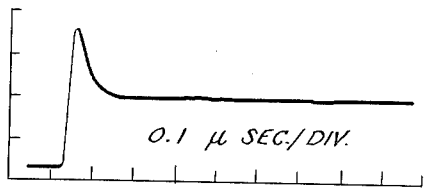
FIGS. 3a–3e are representations of a series of output waveforms which result from the transmission of the step waveform of FIG. 2a through various sections of the passive network and the resistance damped cable.

The peak of FIG. 3a is caused by the fact that a steep wavefront applied to the attenuator does not "see" a balanced resistance-capacitance attenuator, but rather the characteristic impedance of the cable, as the voltage across capacitance 26 requires a finite time to change and thus a large portion of the input transient is delivered to the cable input by capacitance 26, producing a very sharp and fast "spike" at the cable input. Since the attenuator does not function properly for such a fast transient, other components must be used to control the height of the peak of FIG. 3a.

In the complementing circuit, an adjustable shunt capacitance 28 is used to form a capacitive voltage-divider with capacitance 26 for steep wavefronts. By adjustment of capacitance 28, the height of the initial peak may be reduced to the desired final amplitude. The value of capacitance 28 necessary to control the initial peak may be excessive both in terms of a physically variable unit and in terms of the additional input capacitance resulting from the use of this capacitance 28. In this case, resistor 30 may be used to form a resistive voltage divider with the characteristic impedance of the cable, thereby reducing the amplitude of the peak existing at the cable input. Thus less control by capacitance 28 is required and it may then be a smaller value. Resistor 30 is preferably selected to provide a large percentage of the control of the initial peak so that a small adjustable capacitance 28 may be used for critical adjustment.

Figure 3B:
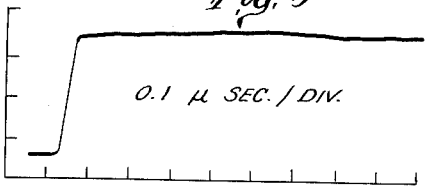
Figure 3C:
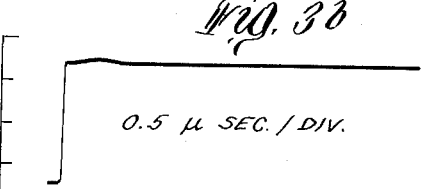

The remaining transient distortions in the output waveform are principally in the form of a bulge, as illustrated in FIGS. 3b and 3c, which occurs with a step input waveform. These are balanced by means of a damped series resonant circuit, consisting of resistance 32, capacitance 34 and inductance 36. The resonant frequency of this circuit is adjusted so that a half-period resonance has the same time duration as the waveform bulge. Resistance 32 controls the amplitude of the effect of the series-resonance circuit on the transmitted waveform and the "Q" of the resonance circuit controls the duration of the effect.

Figure 3D:
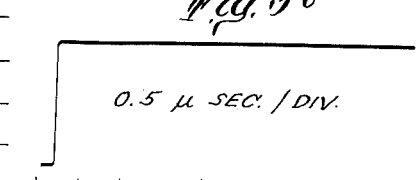
Figure 3E:
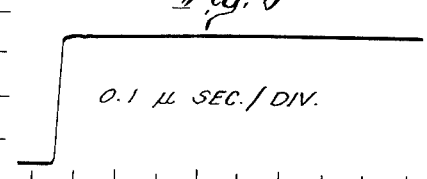

Certain other transient distortions which are frequently of little significance may be reduced by the addition of small passive networks, for example the series network of resistance 38 and capacitance 40. The output waveform of this circuit is shown in FIGS. 3d and 3e.

An improvement in rise time results with the addition of a small resistance 42, in series with the shunt capacitance 28. This resistance affects only the leading edge of the output waveform and in particular the latter portion thereof which tends to be rounded without this resistance. With this resistance, overall rise times in the order of 14–16 m$\mu$sec. (millimicroseconds) may be observed through the cable 10 with an oscilloscope having a 12 m$\mu$sec. rise time.

When this circuit configuration is used, the possibility of paths resonant at high frequency exist in the passive network. A resistance 44 will damp these resonances at a slight sacrifice in rise time. This resistance may alternatively be placed also at points 46 or 48.

Further, the circuit may deliver unwanted grounding-system noise through resistance 24 into the signal circuits. This interference may be avoided by placing resistance 24 across the output terminals of the cable 10 or by inserting a capacitor 50, in series with the input ground lead. The value of this capacitance is selected such that it has a high reactance at power frequencies and will tend to block currents of these frequencies from the signal circuits. When the capacitor 50 is used, direct-coupled transmission of the input waveforms is still possible since both the input and output signals are referred to the same common ground bus. However, if a common grounding bus system is not used, capacitor 50 should be omitted if direct-coupled transmission is desired.

When a step waveform is applied to a complete 230-foot probe system, the waveform at the input terminals of cable 10 appears as in FIG. 2d, and the waveform at the output terminals of cable 10 as in FIG. 2e.

Typical values for the circuit elements in a network utilized with a 230-foot coaxial cable having a characteristic impedance of 145 ohms, a center conductor resistance wire of 635 ohms total, and shunt capacitance of 2200 $\mu\mu$f. connected to a load of one megohm shunted by 20 $\mu\mu$f are as follows:

| | | |
|---|---|---|
| Resistance 22 | megohms | 9 |
| Resistance 24 | kilohms | 100 |
| Resistance 30 | ohms | 300 |
| Resistance 32 | do | 5600 |
| Resistance 38 | do | 6200 |
| Resistance 42 | do | 47 |
| Resistance 44 | do | 100 |
| Capacitance 26 | $\mu\mu$f | 16–27 |
| Capacitance 28 | $\mu\mu$f | 100–150 |
| Capacitance 34 | $\mu\mu$f | 56 |
| Capacitance 40 | $\mu\mu$f | 39 |
| Capacitance 50 | $\mu$f | 0.001 |
| Inductance 36 | $\mu$h | 500 |

The tolerances on the fixed components are not unduly severe. Resistors 22 and 24 must be 1% units for accuracy of D.-C. attenuation. Otherwise, the fixed components require no more than the customary 5% tolerance, and some will perform consistently with 10% tolerance.

Figure 4:
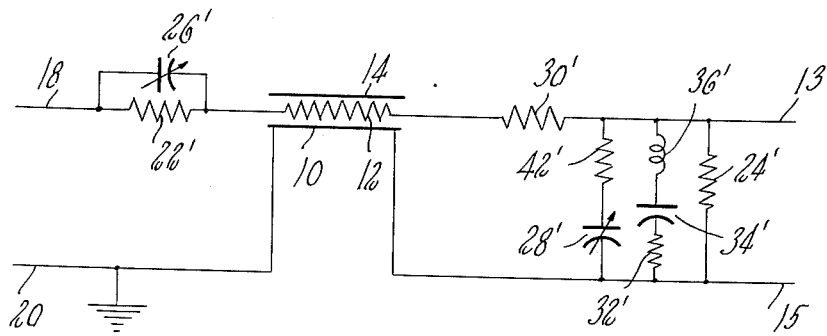
FIG. 4 is a schematic diagram of an alternative embodiment of the invention wherein the passive network is connected at the output of the resistance damped coaxial cable.

The passive network may also be placed on the output side of the cable 10 as shown in FIG. 4. The circuit elements corresponding to those in FIG. 1 are indicated by the same reference numeral and a prime ('). This circuit configuration is preferable if interference from grounding-system noise is a severe problem.

The invention thus provides a signal transmission system adapted to substantially faithfully transmit a signal having a high frequency component in the order of 1–30 megacycles to high impedance load in the order of megohms shunted by a capacitance typically in the order of 20–30 $\mu\mu$f. and includes a coaxial cable normally of a length of from fifteen to three hundred feet or even longer. The coaxial cable is operated unterminated and a network of passive elements, suitable for mounting in a compact probe housing or similar device and adapted for adjustment to substantially the true transient complement of the cable, is connected to the coaxial cable. It is particularly adapted for the maintenance of physically large equipment or the supervision of equipment positioned in hazardous areas.

It will be understood that while there have been shown and described herein preferred embodiments, the invention is not intended to be limited thereby or to all details thereof, and departures may be made therefrom within the spirit and scope of the invention as set forth in the appended claims.

We claim:

1. A signal transmission system for a wide band amplifier comprising input terminal means, output terminal means, an unterminated signal transmission line including an input terminal, an output terminal, and resistance means in said line for damping signal reflections from the unterminated ends of said line, an input circuit connected between said input terminal means and said line including an input circuit resistor and an input circuit capacitor, said input circuit resistor forming a portion of a resistive attenuation network providing attenuation at low frequencies and said input circuit capacitor forming a portion of a capacitive attenuation network providing substantially identical attenuation as said resistive attenuation network at higher frequencies than said resistive attenuation network, a passive component attenuation network operative in the high frequency band where the characteristic impedance of said line appears to be substantially purely resistive to provide overall attenuation in said high frequency band substantially identical to the attenuation provided by said resistive attenuation network and said capacitive attenuation network in the frequency bands in which those networks are operative, comprising a capacitance connected in shunt with said line and a resistance connected to one terminal of said line and connected in series with said line.

2. The combination of claim 1 further including a resistance in series with said second capacitance for shaping the leading edge and reducing the rise time of the output waveform.

3. A signal transmission system for a wide band amplifier comprising input terminal means, output terminal means, an unterminated signal transmission line including an input terminal, an output terminal and resistance means in said line for damping signal reflections from the unterminated ends of said line, an input circuit connected between said input terminal and said line including an input circuit resistor and an input circuit capacitor, said input circuit resistor forming a portion of a resistive attenuation network providing attenuation at low frequencies and said circuit capacitor forming a portion of a capacitive attenuation network providing substantially identical attenuation as said resistive attenuation network at higher frequencies than said resistive attenuation network, and a passive component attenuation network connected between said input circuit and said transmission line, said passive component attenuation network being operative in the high frequency band where the characteristic impedance of said line appears to be substantially purely resistive to provide overall attenuation in said high frequency band substantially identical to the attenuation provided by said resistive attenuation network and said capacitive attenuation network in the frequency bands in which those networks are operative, comprising a capacitance connected in shunt with said line and a resistance connected in series with said line and to said input circuit.

4. A signal transmission system for a wide band amplifier comprising input terminal means, output terminal means, an unterminated signal transmission line including an input terminal, an output terminal, and resistance means in said line for damping signal reflections from the unterminated ends of said line, an input circuit connected between said input terminal means and said line including an input circuit resistor and an input circuit capacitor connected to the input terminal of said line, said input circuit resistor forming a portion of a resistive attenuation network providing attenuation at low frequencies and said input circuit capacitor forming a portion of a capacitive attenuation network providing substantially identical attenuation as said resistive network at higher frequencies than said resistive attenuation network, and a passive component attenuation network connected to said output terminal of said transmission line operative in the high frequency band where the characteristic impedance of said line appears to be substantially purely resistive to provide overall attenuation in said high frequency band substantially identical to the attenuation provided by said resistive attenuation network and said capacitive attenuation network in the frequency bands in which those networks are operative, comprising a capacitance connected in shunt with said line, and a resistance connected in series with said line and to said output terminal means.

5. A signal transmission system for operation with a wide band amplifier having an impedance in excess of a megohm including an input lead, a ground lead, a coaxial cable at least fifteen feet in length including an input terminal, an output terminal, and resistance damping means connected in said cable between said input and output terminals, and an input circuit including an input circuit resistor and an input circuit capacitor connected to said input lead, said input circuit resistor forming a portion of a resistive attenuation network providing attenuation at low frequencies and said input circuit capacitor forming a portion of a capacitive attenuation network providing substantially identical attenuation as said resistive attenuation network at higher frequencies than said resistive attenuation network, a passive network connected between said input circuit and the input terminal of said cable, said passive component attenuation network being operative in the high frequency band where the characteristic impedance of said cable appears to be substantially purely resistive to provide attenuation in said high frequency band substantially identical to the attenuation produced by said resistive attenuation network and said capacitive attenuation network in the frequency bands in which those networks are operative, and including a first capacitance connected in shunt with said cable, a first resistance connected to said cable input terminal in series with said cable, means to control the magnitude of the initial peak in the output waveform produced by said attenuation networks, a damped series resonant circuit connected in shunt with said cable to remove transient distortion in the form of a bulge in the output waveform, a second resistance connected in series with said input lead to damp resonance in said input lead, and a second capacitance connected in series with said ground lead to block low frequency noise signals.

References Cited in the file of this patent
UNITED STATES PATENTS

| | | |
|---|---|---|
| 2,507,191 | Bayard | May 9, 1950 |
| 2,659,052 | Bess | Nov. 10, 1953 |
| 2,680,230 | Garrison et al. | June 1, 1954 |
| 2,790,954 | Corrington | Apr. 30, 1957 |
| 2,881,400 | Rogers | Apr. 7, 1959 |
| 2,883,619 | Kobbe | Apr. 21, 1959 |

OTHER REFERENCES

Article by Charles F. Kezer and Milton H. Aronson published in "Instruments and Automation," December 1955, pages 2102 and 2103 (only page 2102 relied upon).